(12) United States Patent
DeRudder (10) Patent No.: US 8,324,318 B2
(45) Date of Patent: Dec. 4, 2012

(54) TIE LAYER COMPOSITIONS

(75) Inventor: James DeRudder, Mt. Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/003,237

(22) PCT Filed: Jul. 10, 2009

(86) PCT No.: PCT/US2009/050194
§ 371 (c)(1),
(2), (4) Date: Jan. 7, 2011

(87) PCT Pub. No.: WO2010/006226
PCT Pub. Date: Jan. 14, 2010

(65) Prior Publication Data
US 2011/0117369 A1    May 19, 2011

Related U.S. Application Data

(60) Provisional application No. 61/079,633, filed on Jul. 10, 2008.

(51) Int. Cl.
*C08L 67/02* (2006.01)

(52) U.S. Cl. ........ 525/166; 428/412; 428/446; 428/448; 525/100; 525/185; 525/464; 525/466; 525/468

(58) Field of Classification Search ................. 428/412, 428/446, 448; 525/100, 166, 185, 464, 466, 525/468
See application file for complete search history.

(56) References Cited

U.S. PATENT DOCUMENTS

| 3,511,895 | A | 5/1970 | Kydonieus et al. |
|---|---|---|---|
| 3,981,944 | A | 9/1976 | Okamoto et al. |
| 5,100,960 | A | 3/1992 | Grigo et al. |
| 5,126,404 | A | 6/1992 | Eckel et al. |
| 5,414,045 | A | 5/1995 | Sue et al. |
| 7,498,401 | B2 | 3/2009 | Agarwal |
| 2004/0175593 | A1 | 9/2004 | Davis et al. |
| 2006/0199879 | A1* | 9/2006 | Agarwal ..................... 523/201 |
| 2007/0135589 | A1* | 6/2007 | DeRudder et al. ............ 525/464 |
| 2007/0231576 | A1* | 10/2007 | Davis et al. ................. 428/412 |
| 2008/0081860 | A1* | 4/2008 | Li et al. ........................ 524/414 |

FOREIGN PATENT DOCUMENTS

| DE | 4038590 A1 | 6/1992 |
|---|---|---|
| JP | 4285655 A | 10/1992 |
| WO | 2008100326 A1 | 8/2008 |

OTHER PUBLICATIONS

Sheet 1, Tinius Olsen, An introduction to Izod Impact testing of Plastics, 2007, p. 1-4.*
German Patent No. 4038590 (A1); Publication Date: Jun. 11, 1992; Abstract Only; 1 Page.
International Search Report; International Application No. PCT/US2009/050194; International Filing Date: Jul. 10, 2009; Date of Mailing; Nov. 23, 2009; 9 Pages.
Written Opinion of the International Searching Authority; International Application No. PCT/US2009/050194; International Filing Date: Jul. 10, 2009; Date of Mailing; Nov. 23, 2009; 7 Pages.
German Patent No. 4038590; Publication Date: Jun. 11, 1992; Abstract only, 2 pages.
Japanese Patent No. 4285655; Publication Date: Oct. 9, 1992; Abstract Only, 1 page.

* cited by examiner

*Primary Examiner* — David W Wu
*Assistant Examiner* — Robert Jones, Jr.
(74) *Attorney, Agent, or Firm* — Cantor Colburn LLP (57) ABSTRACT

A thermoplastic composition including a combination of a polycarbonate, an impact modifier, an aromatic vinyl copolymer, and a polyester carbonate and/or a polycarbonate polysiloxane copolymer having excellent thermal and mechanical properties as well as good adhesion to both a polymer superstrate and certain types substrates is disclosed. Also disclosed are articles and multilayer films including the tie layer composition.

9 Claims, 1 Drawing Sheet

TIE LAYER COMPOSITIONS

FIELD OF THE INVENTION

The present invention relates to tie layer compositions, multilayer films comprising tie layer compositions, articles prepared therefrom, methods of manufacture, and uses thereof.

BACKGROUND OF THE INVENTION

Multilayer films prepared from polycarbonates and polycarbonate blends have useful properties such as weatherability, scratch resistance, and high gloss, and can be used as surface finish layers for molded articles. Further, where one or more layers of these multilayer films are used to carry a colorant and/or other additives for obtaining visual effects for the article, the multilayer films are useful as paint-replacement layers for molded articles. Articles for which such multilayer films are useful include automotive applications, horizontal applications such as outdoor applications, including sauna covers, pool covers, lawn and garden furniture, rooftops, deck lids, exterior panels, and the like.

A multilayer film can be back molded with a substrate material, such as polyurethane foam, for example, which provides mechanical support and other properties for the multilayer film. The substrate may be a thermoset or a thermoplastic material, as selected. To provide adhesion between the multilayer film and substrate, the multilayer film can be constructed with one or more intermediate layers, referred to as a "tie layer" or "tie layers", that are useful for providing thermal stability as well as adhesion between the superstrates having the surface finish properties, and the substrate.

Tie layers that are adequate for applications such as those described above may nevertheless not be suitable for newer applications with different geometries, different processing conditions and/or different substrate materials. Newer applications for which tie layers with different, improved thermal and mechanical properties are beneficial include, for example, those produced via profile extrusion, sheet extrusion, blow molding, thermoforming, and other processes known in the art, where the composition is exposed to higher temperatures for longer periods of time. Processes like profile extrusion, sheet extrusion, blow molding and thermoforming require materials and films having greater thermal stability, higher modulus and good flow and impact balance. In addition, present tie layers having low modulus often do not age well and therefore are likely to become brittle over time. Low modulus materials do not transfer stress without excessive deformation and therefore are often not suitable for mechanical applications.

There accordingly remains a need in the art for a tie layer composition suitable for preparing a tie layer having improved thermal and mechanical properties as well as good adhesion to other layers in the multilayer film as well as the substrate.

A tie layer prepared using the tie layer composition also desirably provides a lower defect rate, particularly with regard to surface defects, and a better balance of properties such as impact and flow, than that obtained with the currently used tie layer compositions.

SUMMARY OF THE INVENTION

The present invention provides a tie layer composition including a polycarbonate, an impact modifier, an aromatic vinyl copolymer, and a polyester carbonate and/or a polycarbonate-polysiloxane. The tie layer composition has improved thermal stability, high modulus to transfer stress well without excessive deformation, and it is not a source of surface defects.

In one embodiment, a thermoplastic composition includes from 30 to 50 weight percent (wt. %) of a polycarbonate; from 15 to 35 wt. % of a polyester carbonate; from 25 to 35 wt. % of an impact modifier; and from 0 to 10 wt. % of an aromatic vinyl copolymer; based on the total combined weight of the polycarbonate, polyester carbonate impact modifier and aromatic vinyl copolymer, wherein the composition has a Notched Izod impact value at −20° C. of greater than 20 kJ/m$^2$ and a Notched Izod impact at −40° C. greater than 9 kJ/m$^2$, both when measured according to ASTM D256. In some embodiments, the composition has a Melt Stability Melt Stability between −10% and +10% when measured as the percent shift in Melt Volume Rate from a 6 minute preheat to an 18 minute preheat, when measured according to ASTM D1238 at 260° C. using a 5 kilogram weight over 10 minutes. In some embodiments, the composition has a Notched Izod impact value at −20° C. of greater than 25 kJ/m$^2$ and a Notched Izod impact at −40° C. greater than 10 kJ/m$^2$, both when measured according to ASTM D256. In some embodiments, the composition further comprises up to 20 wt. % of a polycarbonate-polysiloxane copolymer. In some embodiments, the aromatic vinyl copolymer comprises SAN, and the SAN may have a nominal acrylonitrile content of from 26 to 28 weight percent.

In another embodiment, a thermoplastic composition includes from 55 to 65 wt. % of a polycarbonate; from 10 to 20 wt. % of a polycarbonate-polysiloxane copolymer; from 10 to 25 wt. % of an impact modifier; and from 10 to 20 wt. % of an aromatic vinyl copolymer; based on the total combined weight of the polycarbonate, polycarbonate-polysiloxane copolymer, impact modifier and aromatic vinyl copolymer, wherein the composition has a peel strength that is higher than a comparable composition without the polycarbonate-polysiloxane copolymer. In some embodiments, the composition further includes a polyester carbonate. In one embodiment, the impact modifier is Bulk ABS.

The present invention also includes articles made using the thermoplastic composition.

In another embodiment, an article includes a polymer substrate; and a multilayer film comprising a superstrate comprising a polycarbonate; and a tie layer, wherein the tie layer comprises the thermoplastic composition, and wherein the tie layer is disposed between the substrate and the superstrate.

In another embodiment, a multilayer film includes a superstrate, wherein the superstrate comprises a polycarbonate, a tie layer comprising the thermoplastic composition of claim 1, and a polymer substrate.

The invention is further described by the following figures.

DETAILED DESCRIPTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides a tie layer composition including a polycarbonate, an impact modifier, an aromatic vinyl copolymer, and a polyester carbonate and/or a polycarbonate-polysiloxane. Surprisingly, it has been found that a tie layer prepared from these compositions exhibit excellent thermal and mechanical properties as well as good adhesion to both a polymer superstrate and certain types substrates. Further, the tie layer composition has an excellent balance of properties such as impact and flow, particularly low flow and low temperature impact. Low flow is beneficial in many of the processes for which the tie layer composition will be used. In normal injection molding processes, high flow is generally beneficial.

As used herein, a "multilayer film" refers to a film having at least one layer (a "superstrate") in addition to the tie layer. The superstrate itself can be a single layer or multiple layers, and the tie layer can comprise one or more layers.

In one aspect, the thermoplastic compositions of the present invention use a polycarbonate. As used herein, the term "polycarbonate" and "polycarbonate resin" means compositions having repeating structural carbonate units of the formula (1):

(1)

in which greater than 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3):

$$HO-A^1-Y^1-A^2-OH \quad (3)$$

wherein $Y^1$, $A^1$ and $A^2$ are as described above. Also included are bisphenol compounds of general formula (4):

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, as well as combinations including at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations including at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of 0.05 to 5.0 wt. %. All types of polycarbonate end groups are contemplated as being useful in the tie layer composition, provided that such end groups do not significantly affect selected properties of the tie layer compositions.

Weight averaged molecular weight (Mw) is a useful measure of the molecular weight of the polycarbonate, wherein Mw is determined by the method of gel permeation chromatography (GPC) using a crosslinked styrene-divinyl benzene GPC column, at a sample concentration of 1 mg/ml, eluted at a flow rate of 1.5 ml/min, and as calibrated using polycarbonate standards. Suitable polycarbonates can have an Mw of 2,000 to 100,000, specifically 5,000 to 75,000, more specifically 10,000 to 50,000, and still more specifically 15,000 to 40,000.

In a specific embodiment, a polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight of 10,000 to 200,000, specifically 15,000 to 100,000, more specifically 17,000 to 50,000, as measured by gel permeation chromatography (GPC), using a crosslinked styrene-divinylbenzene column and calibrated to polycarbonate references.

In one embodiment, the polycarbonate has flow properties suitable for the manufacture of thin articles and films. Melt volume flow rate (often abbreviated MVR) measures the rate of extrusion of a thermoplastics through an orifice at a prescribed temperature and load. Polycarbonates suitable for the formation of thin articles and films may have an MVR, measured at 2600° C./5 kg, of 1 to 70 cubic centimeters per 10 minutes (cc/10 min) specifically 2 to 30 cc/10 min Mixtures of polycarbonates of different flow properties may be used to achieve the overall selected flow property.

"Polycarbonates" and "polycarbonate resins" as used herein include the polycarbonates described above, copolymers having carbonate units with other polymer units, and combinations of the foregoing other thermoplastic polymers, for example combinations of polycarbonate homopolymers and/or copolymers with polyesters. As used herein, a "combination" is inclusive of all mixtures, blends, alloys, reaction products, and the like.

A specific suitable copolymer is a polyester carbonate, also known as a polyester-polycarbonate. Such copolymers further contain, in addition to recurring carbonate units of the formula (1), repeating ester units of formula (6)

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations including at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:9 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In an embodiment, the polyester unit of a polyester-polycarbonate is derived from the reaction of a combination of isophthalic and terephthalic diacids (or derivatives thereof) with a dihydroxy compound, wherein the molar ratio of isophthalate units to terephthalate units is 91:9 to 1:98, specifically 85:15 to 3:97, more specifically 80:20 to 5:95, and still more specifically 70:30 to 10:90. In on embodiment, the dihydroxy compound comprises bisphenol A. In another embodiment, the dihydroxy compound includes resorcinol.

In an embodiment, the polyester-polycarbonates include polyester units including polyarylates, which can be copolymerized to form arylate-ester and carbonate blocks. Included can be polyester-polycarbonates comprising structural units of the formula (8):

wherein each $R^1$ is independently halogen or $C_{1-12}$ alkyl, m is at least 1, p is 0 to 3, each $R^2$ is independently a divalent organic radical, and n is at least 4.

In one embodiment, a specifically suitable combination of polymers for use in the tie layer composition includes bisphenol A polycarbonate polymer and a poly(phthalate-carbonate) (PPC) polymer, wherein the polyester unit of the PPC polymer is derived from the reaction of a combination of isophthalic and terephthalic diacids (or derivatives thereof) with bisphenol A. In a specific embodiment, the poly(phthalate-carbonate polymer can be a poly(isophthalate-terephthalate-bisphenol A)-co-(bisphenol A carbonate) of formula (9):

bonate units of 0:100 to 99:1. In another embodiment, the dihydroxy compound is bisphenol A.

The molar ratio of ester units to carbonate units in the polyester-polycarbonates may vary broadly, for example 1:99 to 99:1, depending on the selected properties of the final composition. The polyester-polycarbonates have, in one embodiment, a molar ratio of ester units to carbonate units of 1:99 to 25:75, specifically 5:95 to 20:80. In another embodiment, the polyester-polycarbonates have a molar ratio of ester units to carbonate units of 25:75 to 99:1, and more specifically 30:70 to 90:10.

In one embodiment, the polyester-polycarbonate has flow properties suitable for the manufacture of thin articles and films and may have an MVR, measured at 260° C./5 kg, of 0.4 to 30 cc/10 min. Mixtures of polycarbonates of different flow properties may be used to achieve the overall selected flow property.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, for example, 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (for example, the bischloroformates of bisphenol A, hydroquinone, or others known in the art) or a glycol (for example, the bishaloformate of ethylene glycol, neopentyl glycol, polyethylene glycol, or others known in the art). Combinations including at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or wherein the ratio of isophthalate units to terephthalate units is 50:50 to 99:1, specifically 85:15 to 97:3; and the polycarbonate unit is derived from bisphenol A such that the ratio of the mixed isophthalate-terephthalate polyester unit p to the polycarbonate unit q is 99:1 to 1:99, more specifically 97:3 to 30:70.

The polycarbonate units are derived from the reaction of a carbonyl source and dihydroxy compounds. In one embodiment, the dihydroxy compounds include a mixture of resorcinol and bisphenol A, to provide a polycarbonate having in a molar ratio of resorcinol carbonate units to bisphenol A carphosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be 0.1 to 10 wt. % based on the weight of bisphenol in the phosgenation mixture. In another embodiment an effective amount of phase transfer catalyst may be 0.5 to 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination including at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination including at least one of the foregoing.

A chain stopper (also referred to as a capping agent) may be included during polymerization. The chain stopper limits molecular weight growth rate, and therefore controls molecular weight in the polycarbonate. A chain stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_{1-22}$ alkyl-substituted phenols, p-cumyl-phenol, p-tertiary-butyl phenol, hydroxy diphenyl; and monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and others known in the art. Specifically, mono-phenolic chain stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates may also be prepared by interfacial polymerization. Rather than utilizing the dicarboxylic acid per se, it is beneficial to use the reactive derivatives of the acid, such as the corresponding acid halides, specifically the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

In some embodiments, the composition comprises a polysiloxane-polycarbonate copolymer. The polysiloxane (also referred to herein as polydiorganosiloxane) blocks of the copolymer comprise repeating polydiorganosiloxane units of formula (10):

(10)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the tie layer composition, the selected properties of the composition, and like considerations. Generally, D may have an average value of 2 to 1,000, specifically 2 to 500, more specifically 5 to 100. In one embodiment, D has an average value of 10 to 75, and in still another embodiment, D has an average value of 20 to 60. Where D is of a lower value, for example, less than 40, it may be beneficial to use a relatively larger amount of the polycarbonate-polysiloxane copolymer. Conversely, where D is of a higher value, for example, greater than 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (11):

(11)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (11) may be derived from a $C_6$-$C_{30}$ dihydroxyarylene compound, for example a dihydroxyarylene compound of formula (3), (4), or (7) above. Combinations including at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations including at least one of the foregoing dihydroxy compounds may also be used.

Such units may be derived from the corresponding dihydroxy compound of formula (12):

(12)

wherein Ar and D are as described above. Compounds of formula (12) may be obtained by the reaction of a dihydroxyarylene compound with, for example, an alpha, omega-bisacetoxypolydiorangonosiloxane under phase transfer conditions.

In another embodiment, polydiorganosiloxane blocks includes units of formula (13):

(13)

wherein R is as described above, D is 1 to 1000, each occurrence of $R^1$ is independently a divalent $C_1$-$C_{30}$ organic radical, and wherein the polymerized polysiloxane unit is the reaction residue of its corresponding dihydroxy compound. In a specific embodiment, the polydiorganosiloxane blocks are provided by repeating structural units of formula (14)

(14)

wherein R and D are as defined above. $R^2$ in formula (14) is a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (14) may be derived from the corresponding dihydroxy polydiorganosiloxane (15):

(15)

wherein R, D, M, $R^2$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures including at least one of the foregoing may also be used.

The weight ratio of polysiloxane units to carbonate units in the polysiloxane-polycarbonates may vary. For example, the polysiloxane-polycarbonates can have, in one embodiment, a weight ratio of siloxane units to carbonate units of 1:99 to 50:50, specifically 2:98 to 30:70, and more specifically 3:97 to 25:75.

In a specific embodiment, the polysiloxane-polycarbonate can include polysiloxane units, and carbonate units derived from bisphenol A in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography as described above. The polysiloxane-polycarbonate can have a melt volume flow rate (often abbreviated MVR), measured at 300° C./1.2 kg, of 1 to 35 cubic centimeter per 10 minutes (cc/10 min), specifically 2 to 30 cc/10 min. Mixtures of polysiloxane-polycarbonates of different flow properties may be used to achieve the overall selected flow property.

Tie layer compositions used for making the tie layers films described herein include an impact modifier to increase the impact resistance. In one embodiment the impact modifiers are prepared by an emulsion polymerization process that is free of any materials that degrade polycarbonates. For example, in an embodiment, the impact modifiers are prepared by a process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

The impact modifiers suitable for use in the tie layer composition include elastomer-modified graft copolymers comprising (i) an elastomeric (for example, rubbery) polymer substrate having a Tg less than 10° C., more specifically less than −10° C., or more specifically −40° to −130° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt. % of a copolymerizable monomer; ethylene-vinyl acetate rubbers; silicone rubbers; elastomeric $C_{1-8}$ alkyl(meth)acrylates; or combinations including at least one of the foregoing elastomers.

Suitable conjugated diene monomers for preparing the elastomer phase are of formula (17):

(17)

wherein each $X^b$ is independently hydrogen, $C_1$-$C_5$ alkyl, or the like. Examples of conjugated diene monomers that may be used include, but are not limited to, butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and others known in the art, or monomers of formula (18):

(18)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Non-limiting examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and combinations including at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (19):

(19)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (18) include acrylonitrile, ethacrylonitrile, methacrylonitrile, alpha-chloroacrylonitrile, beta-chloroacrylonitrile, alpha-bromoacrylonitrile, acrylic acid, methyl(meth) acrylate, ethyl(meth)acrylate, n-butyl(meth)acrylate, t-butyl (meth)acrylate, n-propyl(meth)acrylate, isopropyl(meth) acrylate, 2-ethylhexyl(meth)acrylate, and others known in the art, and combinations including at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and others known in the art, and combinations including at least one of the foregoing monomers. The $C_{1-8}$ alkyl (meth)acrylate monomers may optionally be polymerized in admixture with up to 15 wt. % of comonomers of formulas (17), (18), or (19). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures including at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and others known in the art, as well as combinations including at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and specifically has a gel content greater than 70%. Also suitable are mixtures of butadiene with styrene and/or $C_{4-6}$ alkyl acrylate rubbers.

The elastomeric phase may provide 5 to 95 wt. % of the total graft copolymer, more specifically 20 to 90 wt. %, and even more specifically 40 to 85 wt. % of the elastomer-modified graft copolymer, the remainder being the rigid graft phase.

The rigid phase of the elastomer-modified graft copolymer may be formed by graft polymerization of a mixture including a monovinylaromatic monomer and optionally one or more comonomers in the presence of one or more elastomeric polymer substrates. The above-described monovinylaromatic monomers of formula (18) may be used in the rigid graft phase, including, but not limited to, styrene, alpha-methyl styrene, halostyrenes such as dibromostyrene, vinyltoluene, vinylxylene, butylstyrene, para-hydroxystyrene, methoxystyrene, or combinations including at least one of the foregoing monovinylaromatic monomers. Suitable comonomers include, for example, the above-described monovinylic monomers and/or monomers of the general formula (19). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl(meth)acrylate, ethyl(meth)acrylate, n-propyl(meth)acrylate, isopropyl (meth)acrylate, and the like, and combinations including at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the selected properties of the impact modifier. The rigid phase may generally comprise up to 100 wt. % of monovinyl aromatic monomer, specifically 30 to 100 wt. %, more specifically 50 to 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 wt. % elastomer-modified graft copolymer and 5 to 65 wt. % graft (co)polymer, based on the total weight of the impact modifier. In another embodiment, such impact modifiers comprise 50 to 85 wt. %, more specifically 75 to 85 wt. % rubber-modified graft copolymer, together with 15 to 50 wt. %, more specifically 15 to 25 wt. % graft (co)polymer, based on the total weight of the impact modifier.

Another specific type of elastomer-modified impact modifier comprises structural units derived from at least one silicone rubber monomer; a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (18) or (19), for example, styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, for example, (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methaacryloxypropyl)methyldimethoxysilane, to afford silicone rubber having an average particle size from 100 nanometers to 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

A specific impact modifier that is free from base materials, such as alkali metals, that may catalyze transesterification and/or degradation of polycarbonates is an acrylonitrile-butadiene-styrene (ABS) or Bulk ABS impact modifier wherein the butadiene substrate is prepared using above-described sulfonates, sulfates, or phosphates as surfactants. Other examples of elastomer-modified graft copolymers besides ABS include but are not limited to methacrylate-butadiene-styrene (MBS), acrylonitrile-styrene-butyl acrylate (ASA), and methyl methacrylate-acrylonitrile-butadiene-styrene (MABS). The preparation of such impact modifiers is well-known in the art. Impact modifiers are generally present in amounts of 2 to 30 percent by weight, based on 100 percent by weight of the polycarbonate, the impact modifier, the aromatic vinyl copolymer, and any optional polyester carbonate and/or polycarbonate-polysiloxane copolymer.

In one embodiment, the impact modifier includes acrylonitrile-butadiene-styrene (ABS). The ABS may be prepared by a bulk polymerization process, known in the art. In one embodiment, the ABS is substantially free of compounds that degrade polycarbonates. Use of such an impact modifier can provide thermoplastic compositions having excellent physical properties (for example, low temperature impact resistance and thermal stability) as well as good hydrolytic stability.

A variety of bulk polymerization methods for ABS-type resins are known. In multizone plug flow bulk processes, a series of polymerization vessels (or towers) consecutively connected to each other provides multiple reaction zones. The elastomeric butadiene may be dissolved in one or more of the monomers used to form the rigid phase, and the elastomer solution is fed into the reaction system. During the reaction, which may be thermally or chemically initiated, the elastomer is grafted with the rigid copolymer (for example, SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating may be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a beneficial range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition including a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the selected final product. In various embodiments, the bulk polymerized ABS (BABS) may contain a nominal 15 to 20 wt. % butadiene and a nominal 15 to 20 wt. % acrylonitrile. The microstructure is phased inverted, with occluded SAN in a butadiene or styrene-butadiene elastomeric phase in a SAN matrix. The BABS may be manufactured using a plug flow reactor in series with a stirred, boiling reactor as described, for example, in U.S. Pat. No. 3,981,944 and U.S. Pat. No. 5,414,045.

The composition also includes an aromatic vinyl copolymer, for example, a styrenic copolymer (also referred to as a "polystyrene copolymer"). The terms "aromatic vinyl copolymer" and "polystyrene copolymer" and "styrenic copolymer", as used herein, include polymers prepared by methods known in the art including bulk, suspension, and emulsion polymerization employing at least one monovinyl aromatic hydrocarbon. The polystyrene copolymers may be random, block, or graft copolymers. Examples of monovinyl aromatic hydrocarbons include, but are not limited to, alkyl-, cycloalkyl-, aryl-, alkylaryl-, aralkyl-, alkoxy-, aryloxy-, and other substituted vinylaromatic compounds, as combinations thereof. Specific examples include: styrene, 4-methylstyrene, 3,5-diethylstyrene, 4-n-propylstyrene, α-methylstyrene, α-methylvinyltoluene, α-chlorostyrene, α-bromostyrene, dichlorostyrene, dibromostyrene, tetrachlorostyrene, and combinations thereof. Beneficial monovinyl aromatic hydrocarbons used are styrene and α-methylstyrene.

The aromatic vinyl copolymer contains a comonomer, such as vinyl monomers, acrylic monomers, maleic anhydride and derivatives, and combinations thereof. As defined herein, vinyl monomers are aliphatic compounds having at least one polymerizable carbon-carbon double bond. When two or more carbon-carbon double bonds are present, they may or may not be conjugated to each other, as selected. Suitable vinyl monomers include, for example, ethylene, propylene, butenes (including 1-butene, 2-butene, and isobutene), pentenes, hexenes, and others known in the art; 1,3-butadiene, 2-methyl-1,3-butadiene(isoprene), 1,4-pentadiene, 1,5-hexadiene, and others known in the art; and combinations thereof.

Acrylic monomers include, for example, acrylonitrile, ethacrylonitrile, methacrylonitrile, α-chloroarylonitrile, β-chloroacrylonitrile, α-bromoacrylonitrile, and β-bromoacrylonitrile, methyl acrylate, methyl methacrylate, ethyl acrylate, butyl acrylate, propylacrylate, isopropyl acrylate, and others known in the art, and mixtures thereof.

Maleic anhydride and derivatives thereof include, for example, maleic anhydride, maleimide, N-alkyl maleimide, N-aryl maleimide or the alkyl- or halo-substituted N-arylmaleimides, and others known in the art, and combinations thereof.

The amount of comonomer(s) present in the aromatic vinyl copolymer can vary. However, the level is generally present at a mole percentage of 2% to 75%. Within this range, the mole percentage of comonomer may specifically be up to 50%, more specifically up to 40%. Specific polystyrene copolymer resins include poly(styrene maleic anhydride), commonly referred to as "SMA" and poly(styrene acrylonitrile), commonly referred to as "SAN".

In one embodiment, the aromatic vinyl copolymer includes (a) an aromatic vinyl monomer component and (b) a cyanide vinyl monomer component. Examples of (a) the aromatic vinyl monomer component include a-methylstyrene, o-, m-, or p-methylstyrene, vinyl xylene, monochlorostyrene, dichlorostyrene, monobromostyrene, dibromostyrene, fluorostyrene, p-tert-butylstyrene, ethylstyrene, and vinyl naphthalene, and these substances may be used individually or in combinations. Examples of (b) the cyanide vinyl monomer component include acrylonitrile and methacrylonitrile, and these may be used individually or in combinations of two or more. There are no particular restrictions on the composition ratio of (a) to (b) in the aromatic vinyl copolymer thereof, and this ratio should be selected according to the application in question. In some embodiments, the aromatic vinyl copolymer optionally has a high acrylonitritile content and contains at least 26 wt. %, specifically 26 to 35 wt. % (b) by weight of (a)+(b) in the aromatic vinyl copolymer and, correspondingly, less than 75 wt. %, specifically 74 to 65 wt. % (a) by weight of (a)+(b) in the aromatic vinyl copolymer. In other embodiments, the aromatic vinyl copolymer optionally contains less than 26 wt. %, specifically 2 to 25 wt. % (b) by weight of (a)+(b) in the aromatic vinyl copolymer and, correspondingly, at least 75 wt. %, specifically, 75 to 98 wt. % (a) by weight of (a)+(b) in the aromatic vinyl copolymer.

The weight average molecular weight (Mw) of the aromatic vinyl copolymer can be 50,000 to 200,000, measured by on a polystyrene standard molecular weight scale.

Various additives known to those of skill in the art may be added to these tie layer compositions, and mixtures of additives may be used. Such additives include fillers, reinforcing agents, pigments, flame retardants, anti-drip agents, plasticizers, UV stabilizers, thermal stabilizers, antioxidants, plasticizers, antistatic additives, colorants, gamma-ray stabilizers, a combination including at least one of the foregoing, as long as the inclusion of such additives does not adversely affect beneficial properties of the tie layer composition. Additives may be added at a suitable time during the mixing of the components for forming the composition. In some embodiments, each additive is substantially free of compounds that cause polymer degradation, or that generate degradative material, upon hydrolytic aging in the composition. Where additives are included and unless otherwise specified, the combined weights of the polycarbonate, impact modifier, aromatic vinyl copolymer, and polyester carbonate and/or polycarbonate-polysiloxane copolymer, with the combined weight percentages of all specified components, may not exceed 100 wt. % of the tie layer composition.

The tie layer compositions for use in preparing tie layers for multilayer films may be manufactured by methods generally available in the art. For example, in one embodiment, in one manner of proceeding, a powdered polycarbonate resin and any other components are first blended in a high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a side-stuffer. Such additives may also be compounded into a masterbatch with a selected polymeric resin and fed into the extruder. The additives may be added to the polycarbonate base material to make a concentrate, before this is added to the final product. The extruder is generally operated at a temperature higher than that necessary to cause the composition to flow, typically 400° F. (204° C.) to 650° F. (343° C.). The extrudate is immediately quenched in a water batch and pelletized. The pellets, prepared by cutting the extrudate, may be one-fourth inch long or less as selected. Such pellets may be used for subsequent extrusion, casting, molding, shaping, or forming of layers, where the layers can be used in a multilayer film, as further described below.

Figure 1:
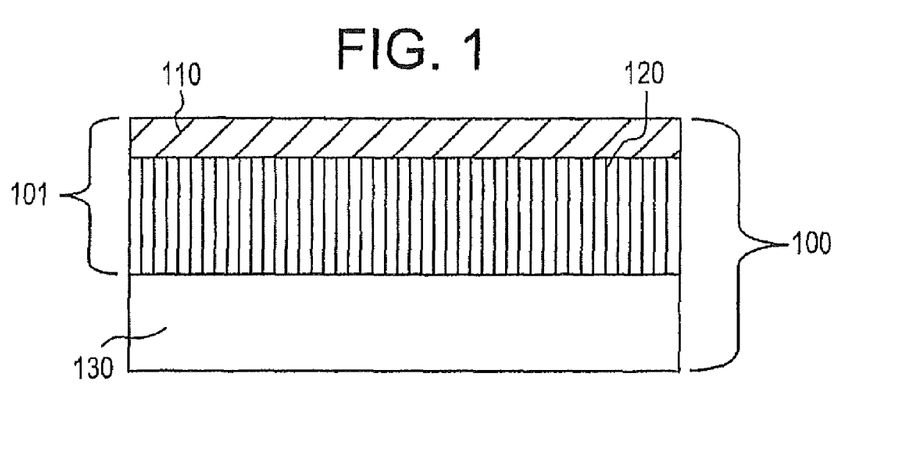
FIG. 1 shows one embodiment of an article comprising a multilayer film and substrate.

The foregoing compositions are used to form articles including multilayer films and substrates. An exemplary embodiment of an article 100 is shown in FIG. 1. FIG. 1 depicts a multilayer film 101 having a superstrate layer 110, a substrate 130, and a tie layer 120 comprising the tie layer composition disposed therebetween. As used herein "disposed" means in at least partial contact with. In some embodiments, tie layer 120 may comprise colorant and/or filler to provide optical effect for the multilayer film.

The tie layer composition includes a polycarbonate, an impact modifier, and an aromatic vinyl copolymer, and a polycarbonate-polysiloxane copolymer and/or a polyester carbonate. The tie layer is disposed between and in at least partial contact with a superstrate and/or a substrate, each of which can possess surface properties the same as or different from one another. The superstrates and substrates can comprise similar or dissimilar compositions. The tie layer is specifically useful for providing beneficial thermal and mechanical properties as well as surface adhesion properties between the tie layer and each adjacent layer, specifically where the adjacent layers may have poor adhesion to each other when contacted to each other directly.

The article can include a substrate, also referred to herein as a substrate layer. The substrate can be any surface to which the multilayer film is contacted. Specifically, the substrate can be a surface that provides a structural backing to the multilayer film. The article may have only a substrate, a superstrate, or both, as well as additional layers.

The substrate may include a material such as a thermoplastic resin, a thermoset resin, a metal, a ceramic, a glass, a cellulosic material, and a combination including one or more of these. There is no particular limitation on the thickness of the substrate layer provided that an article comprising the multilayer film and substrate can be processed into a final selected form. In an embodiment, the substrate is a polymer substrate comprising a thermoplastic polymer. Thermoplastic polymers include, but are not limited to, polycarbonates, particularly aromatic polycarbonates, polyurethanes, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, polyesters, liquid crystalline polyesters, polyetheresters, polyetheramides, polyesteramides, and polyester-polycarbonates (other than those employed for the tie layer and/or the layers of the multilayer film, as defined herein). A substrate layer may contain additives including, but not limited to, colorants, pigments, dyes, impact modifiers, stabilizers, color stabilizers, heat stabilizers, light stabilizers, UV screeners, UV absorbers, flame retardants, anti-drip agents, fillers, flow aids, plasticizers, ester interchange inhibitors, antistatic agents, and mold release agents, as described hereinabove.

Suitable substrate polycarbonates (sometimes referred to hereinafter as "PC")) can be polycarbonates or polyester-polycarbonates as described hereinabove. In a specific embodiment, the polycarbonate can be a bisphenol A polycarbonate homopolymer and/or copolymer.

Polyester substrates can include polyesters such as those described hereinabove. Specifically suitable polyesters include, but are not limited to, poly(alkylene dicarboxylates), specifically poly(ethylene terephthalate) (sometimes referred to hereinafter as "PET"), poly(1,4-butylene terephthalate) (sometimes referred to hereinafter as "PBT"), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate). Also included are polyarylates, examples of which include those including structural units derived from bisphenol A, terephthalic acid, and isophthalic acid.

Polyurethane substrates can include long fiber injection polyurethane (LFI-PU) foam, and reactive injection molded polyurethane foam (RIM-PU). Suitable polyurethane substrates have urethane repeating units. Aromatic, aliphatic, cycloaliphatic, or mixed aliphatic and cycloaliphatic urethane repeating units may be used. Urethanes are typically prepared by the condensation of a diisocyanate with a diol. The diisocyanate and diol used to prepare the urethane can include divalent aromatic, aliphatic, or aliphatic and aromatic groups that may be the same or different. The divalent units can also be $C_6$ to $C_{30}$, specifically $C_6$ to $C_{25}$, more specifically $C_6$ to $C_{20}$ aromatic groups, including substituted and unsubstituted aromatic.

The aliphatic polyisocyanate component generally contains 4 to 20 carbon atoms. Exemplary aliphatic polyisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and combinations including at least one of the foregoing. Suitable aromatic polyisocyanates include toluene diisocyanate, methylene bis-phenylisocyanate (diphenylmethane diisocyanate), methylene bis-cyclohexylisocyanate (hydrogenated MDI), naphthalene diisocyanate, and others known in the art.

Suitable diols may include aromatic dihydroxy compounds according to Formulas (4) and (7) and as described herein, and diols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and others known in the art; alicyclic alcohols such as 1,2-cyclopentanediol, 1,2-cyclohexanediol, and others known in the art; branched acyclic diols such as 2,3-dimethyl-2,3-butanediol(pinacol), 1,4-dimethylol cyclohexane, and others known in the art; and polyols. Polyether and/or polyester urethanes include the reaction product of an aliphatic polyether or polyester polyol with an aliphatic or aromatic polyisocyanate can also be used. The polyether polyol can be based on a straight chained or branched alkylene oxide of from one to twelve carbon atoms.

Suitable addition polymer substrates can include homo- and copolymeric aliphatic olefin and functionalized olefin polymers which are compatible with polycarbonate, which are homopolymers and copolymers including structural units derived from aliphatic olefins or functionalized olefins or both, and their alloys or blends. Illustrative examples can include, but are not limited to, poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) (PMMA), and polymers of alkenylaromatic compounds such as polystyrenes, including syndiotactic polystyrene. In some embodiments addition polymer substrates are polystyrenes, such as acrylonitrile-butadiene-styrene (ABS) and acrylonitrile-styrene-acrylate (ASA) copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends can include, but are not limited to, those including PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polypropylene, polyphenylene ether-polyamide or polyphenylene ether-polyester. Although the substrate layer may incorporate other thermoplastic polymers, the above-described polycarbonates and/or addition polymers often constitute the major proportion thereof.

The substrate layer may also include a cured, uncured or at partially cured thermoset resin, wherein the use of the term "thermoset resin" in the present context refers to any of these options. Suitable thermoset resin substrates include, but are not limited to, those derived from epoxies, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. The thermoset resin substrate may further comprise, for example, a thermoplastic polymer including, but not limited to, polyphenylene ether, polyphenylene sulfide, polysulfone, polyetherimide, or polyester. The thermoplastic polymer can be combined with thermoset monomer mixture prior to curing of the thermoset.

A thermoplastic or thermoset substrate layer can include a colorant and/or filler as disclosed hereinabove. Illustrative extending and reinforcing fillers and colorants include, for example, silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic.

The substrate layer may also include a cellulosic material including, but not limited to, wood, paper, cardboard, fiber board, particle board, plywood, construction paper, Kraft paper, cellulose nitrate, cellulose acetate butyrate, and similar cellulosic-containing materials. Blends of a cellulosic material and either a thermoset resin (such as an adhesive), a thermoplastic polymer (particularly a recycled thermoplastic polymer, such as PET or polycarbonate), or a mixture including a thermoset resin and a thermoplastic polymer, may be used.

As shown in FIG. 1, in one embodiment, the superstrate 110 is a single layer that forms the outer surface of multilayer film 100. In this embodiment the superstrate is disposed on and in intimate contact with the tie layer, and functions as a surface layer. The tie layer in this embodiment may advantageously include a tie layer composition capable of having the colorant and other additives dispersed therein if selected, which can provide selected surface finish properties for the multilayer film.

This surface layer generally includes a thermoplastic polymer. Thermoplastic polymers suitable for use in the surface layer are those that are characterized by optical transparency, improved weatherability, chemical resistance, and low water absorption. It is also generally beneficial that the thermoplastic polymer have good melt compatibility with the tie layer composition of the tie layer. Suitable thermoplastic polymers are polycarbonate including polyester-polycarbonate, or blends of polyesters with polycarbonates. Polyesters, where used in a blend, may be cycloaliphatic polyesters, polyarylates or a combination of cycloaliphatic polyesters with polyarylates. Specifically useful are polyester-polycarbonates.

In one embodiment, the polyester-polycarbonates include polyester units comprising polyarylates, which can be copolymerized to form arylate-ester and carbonate blocks. Included can be polyester-polycarbonates including structural units of the formula (8), as previously described, wherein each $R^1$, m, p, each $R^2$, and n is as previously described. Specifically n is at least 10, more specifically at least 20 and most specifically 30 to 150. Specifically m is at least 3, more specifically at least 10 and most specifically 20 to 200. In an exemplary embodiment m is present in an amount of 20 and 50. In a specific embodiment, the weatherable composition is a poly(isophthalate-terephthalate-resorcinol)-co-polycarbonate copolymer.

Figure 2:
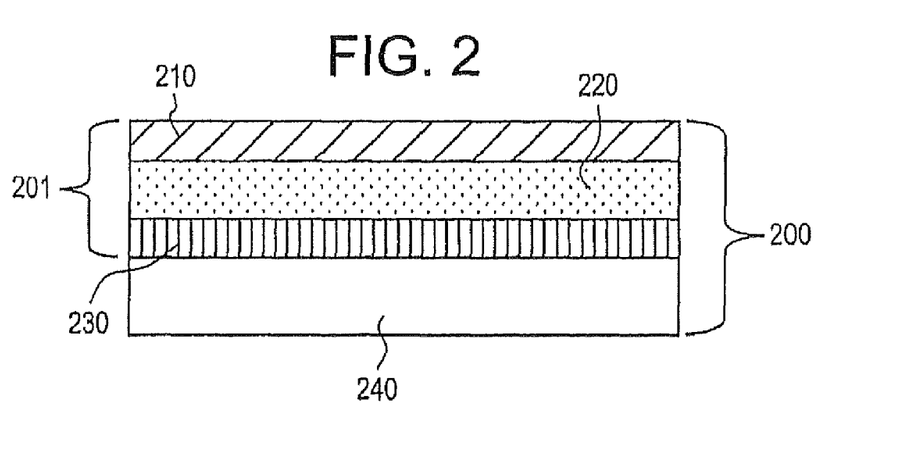
FIG. 2 shows another embodiment of an article comprising a multilayer film and substrate.

In another embodiment, the superstrate includes two layers, for example as shown in FIG. 2 at 201. FIG. 2 depicts an article 200 comprising a multilayer film 201 having a surface layer 210, an intermediate layer 220, and a tie layer 230. A substrate 240 is included on a face of the tie layer 230. In an embodiment, intermediate layer 220 may include additives including, for example, colorants and/or fillers to provide optical effect. In another embodiment, one or more of tie layer 230 and intermediate layer 220 can include additives.

The multilayer film may further include an intermediate layer, wherein the intermediate layer can be contacted to a surface of the tie layer. In a specific embodiment, a first tie layer is contacted to a first surface of the intermediate layer, and a second tie layer is contacted to a second surface of the intermediate layer opposite the first tie layer. In another embodiment, the superstrate comprises one or more layers in addition to the surface layer and disposed between the surface layer and the tie layer, at least one layer of which can be a second tie layer. In a specific embodiment, the multilayer film has a surface layer, a first tie layer contacted to the surface layer, and a second tie layer contacted to the first tie layer on a side opposite the surface layer. In another specific embodiment, an additional, intermediate layer is disposed between the first and second tie layers. The intermediate layer generally includes a suitable thermoplastic polymer.

The multilayer film may include only two layers wherein one layer is a tie layer and the other layer is a film or sheet that may function as a substrate or superstrate or another layer.

A suitable thermoplastic polymer for use in an intermediate layer can have suitable film forming properties, including, for example, color capability, coefficient of thermal expansion, melt flow, ductility, adhesion, a combination including one or more of these properties, as well as other suitable properties known in the art.

Suitable intermediate layers can include polycarbonates as defined hereinabove. In a specific embodiment, the polycarbonate can be a blend with polymers such as polyesters; polyester-polycarbonates; polysiloxane-polycarbonates; impact modifiers; a combination including one or more of these, and the like. Specific examples of polymers suitable for use in the intermediate layer include, but are not limited to, bisphenol A polycarbonate, poly(phthalate-carbonate) (PPC), poly(isophthalate-terephthalate-resorcinol)-co-(bisphenol-A carbonate), acrylonitrile-butadiene-styrene terpolymer, styrene-acrylonitrile copolymer, acrylonitrile-styrene-acrylate terpolymer, combinations including one or more of these, and others known in the art and as previously described herein.

In one embodiment, a specifically suitable combination of polymers for use in the intermediate layer includes bisphenol A polycarbonate polymer and a poly(phthalate-carbonate) (PPC) polymer, wherein the polyester unit of the PPC polymer is derived from the reaction of a combination of isophthalic and terephthalic diacids (or derivatives thereof) with bisphenol A. In a specific embodiment, the poly(phthalate-carbonate polymer can be a poly(isophthalate-terephthalate-bisphenol A)-co-(bisphenol A carbonate) of formula (9), as previously described.

In one embodiment, the intermediate layer can also include additives to provide optical effects. Specifically, additives suitable for use in providing optical effects are described hereinabove and can include, for example, colorants and/or filler, wherein the filler can include light reflective and/or refractive filler.

In another embodiment, where it is not beneficial to use an intermediate layer in a multilayered film, such as for example, wherein the multilayer film has a surface layer contacted to a tie layer, and a substrate contacted to a side of the tie layer opposite the surface layer, the tie layer can further include additives for optical effects.

Figure 3:
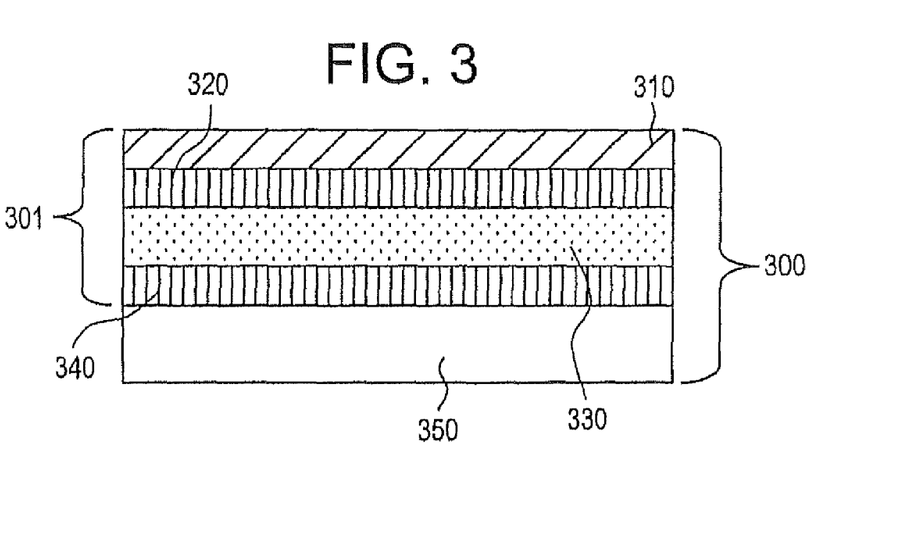
FIG. 3 shows another embodiment of an article comprising a multilayer film and substrate.

In other embodiments, the superstrate includes three or more layers, for example as shown in FIG. 3 at 301. FIG. 3 depicts an article 300 including a multilayer film 301 having a surface layer 310, a first tie layer 320, an intermediate layer 330, and a second tie layer 340. A substrate 350 is included on a face of the second tie layer 340. In an embodiment, intermediate layer 330 includes additives including, for example, colorants and/or fillers to provide optical effect. In another embodiment, one or more of first tie layer 320, intermediate layer 330, and second tie layer 340 can include additives.

Thus, in one embodiment, the superstrate includes a surface layer disposed on the tie layer. In a further embodiment, an intermediate layer is disposed between the surface layer and the tie layer. In another further embodiment, an additional tie layer is disposed between the surface layer and the additional tie layer, wherein the second tie layer includes a polycarbonate, an impact modifier, an aromatic vinyl copolymer, and a polycarbonate-polysiloxane copolymer and/or a polyester carbonate, and wherein the intermediate layer is disposed on the first tie layer. In another embodiment, a second tie layer can be disposed between the first tie layer and the surface layer.

It is contemplated herein that the additives for providing an optical effect in the multilayer film can be present in any one of a number of combinations wherein, for example, the colorant is present in a different layer than the filler, or alternatively, different combinations of colorants and/or fillers are present in different layers. It will be appreciated by one skilled in the art that the multilayer film disclosed herein may be used with a variety of combinations of additives and layers to provide different and useful optical effects combinations within the scope of this disclosure, that the multilayer films disclosed herein are not limited to the particular combination and or numbers of additives and layers, and compositions thereof disclosed in the foregoing exemplary embodiments. The multilayer films disclosed herein should therefore not be considered as limited thereto.

In some embodiments, the tie layer of the multilayer film can have a thickness of 1 to 100 mils, specifically 2 to 75 mils, more specifically 3 to 60 mils, and still more specifically 5 to 50 mils. The surface layer can have a thickness of 1 to 50 mils, specifically 2 to 40 mils, more specifically 3 to 30 mils, and still more specifically 5 to 20 mils. The intermediate layer can have a thickness of 1 to 100 mils, specifically 5 to 75 mils, more specifically 8 to 60 mils, and still more specifically 10 to 50 mils. In some embodiments, the multilayer film can have a total thickness of 3 to 500 mils, specifically 4 to 250 mils, more specifically 5 to 200 mils, and still more specifically 10 to 100 mils. In other embodiments, the thicknesses may be considerably thicker or thinner, depending on the end use and application.

Mismatch between coefficients of thermal expansion (CTE) of the tie layer, and surface layer and/or intermediate layer, and an underlying substrate may induce very high thermal stress and cause delamination in the final multilayer articles. In various embodiments of the present invention the adhesive layer can be formulated for applications with multilayer articles including the surface layer and substrate layer with different coefficients of thermal expansion (CTE), for example, a high CTE surface layer on a low CTE substrate.

In one embodiment, the difference in coefficients of thermal expansion (CTE) between the layers having the highest and lowest CTE, wherein the layers comprise the tie layer, surface layer, intermediate layer, and substrate, may differ by an amount less than or equal to 15 parts per million per degree centigrade (ppm/° C.), specifically less than or equal to 10 ppm/° C., more specifically less than or equal to 5 ppm/° C., and still more specifically less than or equal to 2 ppm/° C.

The multilayer film can be prepared using methods known in the art, such as extrusion methods. Specifically, the multilayer film may be extruded as individual films, and contacted to each other to form a multilayer film. Suitable methods for application include fabrication of a separate sheet of coating layer followed by application to the second layer, as well as simultaneous production of both layers. Alternatively, the multilayer film can be prepared by coextrusion with an additional layer, wherein application of a first layer to a second layer is performed in the melt. Thus, there may be employed such illustrative methods as molding, compression molding, thermoforming, co-injection molding, coextrusion, extrusion coating, melt coating, overmolding, multi-shot injection molding, sheet molding and placement of a film of the coating layer material on the surface of the second layer followed by adhesion of the two layers, typically in an injection molding apparatus; for example, in-mold decoration.

The multilayer film may generally be produced by extrusion followed by laminating the sheets in a roll mill or a roll stack. The extrusion of the individual layers of the multilayer film may be performed in a single screw extruder or in a twin screw extruder. It is beneficial to extrude the layers in a single screw extruder and to laminate the layers in a roll mill. It is more beneficial to co-extrude the layers in a single screw extruder or twin screw extruder and to optionally laminate the layers in a roll mill The roll mill may be either a two roll or three roll mill, as is selected. Co-extrusion of the layers by single screw extruders is generally beneficial for the manufacturing of the multilayer film.

In an embodiment, in the extrusion of the tie layer and the surface layer, the additives (for example, colorant and/or filler) may be added to the extruder along with the polymer at the feed throat. In another embodiment, in the coextrusion of the tie layer and the surface layer, the additives may be added to the extruder in the form of a masterbatch. While the polymer is fed to the throat of the extruder, the masterbatch may be fed either at the throat of the extruder or downstream or the throat. In an embodiment, in the production of the tie layer, the polymers (such as polycarbonate, impact modifier, etc.) are fed to the throat of a single screw extruder while the additives are added in masterbatch form downstream of the feed throat. In another embodiment, in the production of the surface layer, the polymer, such as a thermoplastic polymer is fed to the throat of a single screw extruder. In a specific embodiment, where an intermediate layer may also be coextruded, additives can be added to the extruder in the form of a masterbatch.

In an embodiment, the selected composition for the tie layer and the surface layer may be separately precompounded prior to coextrusion. In this event, the precompounded materials may be first melt blended in a twin screw extruder, single screw extruder, buss kneader, roll mill, or method known in the art, prior to being formed into a suitable shapes such as pellets, sheets, etc., for further co-extrusion. The precompounded tie and surface layer compositions, and where selected, intermediate layer composition, may then be fed into the respective extruders for co-extrusion.

As stated above, it may be beneficial to co-extrude the top and the tie layer, and intermediate layer where included. In an embodiment, in one manner of co-extruding of the multilayer film, the melt streams (extrudates) from the various extruders are fed into a feed block die where the various melt streams are combined before entering the die. In another embodiment, the melt streams from the various extruders are fed into a multi-manifold internal combining die. The different melt streams enter the die separately and join just inside the final die orifice. In yet another embodiment, the melt streams from the various extruders are fed into a multi-manifold external combining die. The external combining dies have completely separate manifolds for the different melt streams as well as distinct orifices through which the streams leave the die separately, joining just beyond the die exit. The layers are combined while still molten and just downstream of the die. A die used in the production of the multilayer film is a feed block die. In an embodiment, the extruders used for the co-extrusion of the top and tie layers, and intermediate layer where included, can be single screw extruders respectively.

The substrate can be contacted to the tie layer of the multilayer film by laminating, calendaring, rolling, or otherwise bonding the tie layer to the substrate using heat and/or pressure. An adhesive may also be used to bond the tie layer to the substrate. The substrate may also be coextruded with the multilayer film including the tie layer to form a multilayer structure. Alternatively, the substrate can be molded to the multilayer film including tie layer. The molding of the substrate may be done either before or after forming the tie layer.

The multilayer film can be contacted to the substrate layer by use of known methods, for example lamination using heat and pressure as in compression molding, or using other forming techniques such as vacuum forming or hydroforming An adhesive layer may optionally be used, wherein the adhesive layer may be applied to a side of the multilayer film having an exposed side of the tie layer, and contacting the adhesive layer to the substrate. Alternatively, the adhesive layer can be applied to the substrate layer, and the multilayer film having an exposed side of the tie layer can be contacted thereto. For adhesive already in film form the adhesive layer can be formed adjacent to the tie layer in the multilayer film either after or during a process (such as coextrusion) to form the multilayer film, and become an integral part of the multilayer film, which can be directly formed by contacting the multilayer film to the substrate using processes using, for example, heat and pressure. The adhesive can also be applied without heat and pressure (referred to as cold application), which is one advantage of using the adhesive in addition to the tie layer composition of the invention.

Alternatively, the tie layer, surface layer, and optionally the intermediate layer(s) can be coextruded to form the multilayer film, wherein an exposed side of the multilayer film can be the tie layer. Assembly of a multilayer film with a preformed substrate layer may be done using known methods such as lamination. The multilayer film-substrate assembly can be optionally thermoformed to the approximate shape of an article before molding, wherein the article is formed by molding the assembly. Alternatively, the substrate can be molded to a surface of the multilayer film to form the multilayer film-substrate assembly as a sheet. The assembly may be cut, shaped, sectioned, or otherwise pre-formed to the approximate shape of an article, and thermoformed and/or molded to the selected shape.

In another embodiment, an article includes: (i) a first tie layer including polycarbonate, an impact modifier, and an aromatic vinyl copolymer, and optionally a polycarbonate-polysiloxane copolymer and/or a polyester carbonate; (ii) a surface layer comprising a weatherable composition disposed on a side of the tie layer; (iii) optionally an intermediate layer and/or second tie layer disposed on a side of the first tie layer opposite the surface layer, wherein when both are used, the second tie layer can be disposed on a side of the intermediate layer opposite the first tie layer; and (iv) a substrate layer, wherein the substrate layer is in contiguous contact with the first tie layer, or optionally where used, the second tie layer. The article may be prepared by a method including assembling the tie layer, surface layer, optional intermediate layer and/or second tie layer to form a multilayer film, thermoforming and/or molding the multilayer film into a shape, and molding a substrate to a side of the multilayer film having a tie layer exposed. In an embodiment, the article may be subjected to heat for curing and/or annealing. In some embodiments, there is a recycle layer disposed between two tie layers, or a tie layer and another layer. The recycle layer may be used to provide additional structure to the article. Using a recycle layer between two tie layers, or a tie layer and another layer, is an economical use of materials that may otherwise not be used, and it will not adversely affect the final properties of the article.

Specifically, it is beneficial to apply in the melt a structure comprising the tie layer, surface layer, and where selected, optional intermediate layer and/or second tie layer, to a substrate layer. This may be achieved, for example, in an embodiment, by charging an injection mold with the structure comprising the tie layer, surface layer, and where selected, optional intermediate layer and/or second tie layer, and injecting the substrate behind it. By this method, in-mold decoration and the like are possible. In one embodiment both sides of the substrate layer may receive the multilayer film, while in another embodiment, multilayer film can be applied to only one side of the substrate.

In one embodiment, a specifically useful method of molding is long-fiber injection (LFI), wherein the substrate material and a reinforcing fiber such as, for example, glass rovings cut to a length of 10 to 100 millimeters, are combined simultaneously in a mold during molding. In a specific embodiment, the substrate includes a long-fiber injected polyurethane (LFI-PU). In another embodiment, a specifically useful method is reaction injection molding (RIM). In this method, at least two components each including a thermoset material, such as for example a diisocyanate and diol, that produce a polyurethane upon reacting, are mixed just prior to injection into the mold. The components react upon entering the mold. In a specific embodiment, the substrate is a reaction injection molded polyurethane (RIM-PU).

In another embodiment, the composition (beneficially in a liquid or molten state) can be poured into a mold, or a rotational molding process using a film in the mold for the outside surface can be used, wherein a low temperature polymer composition is molded against the film in the rotational mold. In another embodiment, the composition may be in a powder form which can be heated on a heated metal surface to form a layer, which may be the outside, visible surface. A foam layer may be later injected behind the layer.

The multilayer films as described above, and as applied to the substrate to form the article, are specifically useful in paint replacement layers where the multilayer film may be contacted with the substrate by a thermoforming process, such as in-mold decorating or thick sheet forming The multilayer articles including the various layer components of this invention are typically characterized by the usual beneficial properties of the substrate layer, in addition to weatherability, as may be evidenced by such properties as improved initial gloss, improved initial color, improved resistance to ultraviolet radiation and maintenance of gloss, improved impact strength, and resistance to organic solvents encountered in their final applications. In some applications, such as automotive applications, a "class A" surface may be beneficial and may be obtained by laminated a superstrate to the tie layer which has low surface roughness (which consequently affects the visual appearance of the surface. Depending upon such factors as the coating layer/substrate combination, the articles may possess recycling capability, which makes it possible to employ the regrind material as a substrate for further production of articles of the invention. The articles often exhibit low internal thermal stress induced from CTE mismatch between layers. The articles may also possess excellent environmental stability, for example thermal and hydrolytic stability.

Articles which can be made that include the various layer components of this invention include articles for OVAD applications; exterior and interior components for aircraft, automotive, truck, military vehicle (including automotive, aircraft, and water-borne vehicles), scooter, and motorcycle, including panels, quarter panels, rocker panels, vertical panels, horizontal panels, security panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; counter tops; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; phone bezels; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on the articles, such as, but not limited to, molding, in-mold decoration, baking in a paint oven, lamination, annealing, and/or thermoforming.

Surprisingly, it has been found that a tie layer, prepared from a tie layer composition including a blend of a polycarbonate, an impact modifier, and an aromatic vinyl copolymer, and a polycarbonate-polysiloxane copolymer and/or a polyester carbonate, has excellent thermal and mechanical properties as well as good adhesion to the superstrate (such as the intermediate layer and/or surface layer) in a multilayer film which includes the tie layer. Further, improved thermal and mechanical properties and adhesion between the tie layer prepared from the tie layer composition and a substrate is obtained. Specifically, the adhesion of the tie layer to the substrate is improved in some embodiments wherein the substrate comprises polycarbonate, LFI-PU, or RIM-PU.

The adhesion between the multilayer film comprising the tie layer composition including a blend of a polycarbonate, an impact modifier, and an aromatic vinyl copolymer, and a polycarbonate-polysiloxane copolymer and/or a polyester carbonate, and a substrate layer, can be similar to the adhesion of commercially available impact modified polycarbonate materials while having other superior physical properties such as heat stability and excellent impact properties.

The above properties are further illustrated by the following non-limiting examples.

Samples were produced using the following method. All thermoplastic compositions were compounded on a 30 mm Werner & Pfleiderer™ twin screw extruder (9 barrel, vacuum port located in barrel 7) at a nominal melt temperature of 525° F., 25 inches of vacuum at 500 rpm. "Normal" molding was conducted with a 35 second cycle time, while "abusive" molding had a six minute cycle time. The twin-screw extruder had enough distributive and dispersive mixing elements to produce good mixing between the polymer compositions. The compositions are subsequently extruded to form multilayer films using a single screw extruder at 480° F. equipped with a single manifold die and feedblock, further described below. It will be recognized by one skilled in the art that the method may not be limited to these times and temperatures because specific configurations will have different optimal combinations.

The components used in the preparation of examples are given in Table 1. The components were mixed in the given formulations and comparative formulations according to the proportions given in Table 2. Results of the various tests are shown in Tables 3 to 5. Samples were tested in accordance with ASTM standards or other special test methods as described below.

Notched Izod Impact strength (NII) was determined on 3.2 mm (one-eighth inch) bars per ASTM D256. Izod Impact Strength ASTM D256 is used to compare the impact resistances of plastic materials. The results are defined as the impact energy in ft. lbs used to break the test specimen, divided by the specimen area at the notch. Results are reported in ft. lbs/in.

Melt volume rate (MVR) was determined at 260° C. using a 5-kilogram weight, over 10 minutes, in accordance with ASTM D1238. The preheat time used was either 6 or 18 minutes, as specified in the tables.

Melt Stability is a measure of the percent shift in Melt Volume Rate when going from a 6 minute preheat to an 18 minute preheat.

Peel strength was determined according to the following method. Samples of the composite film were cut into one-inch wide stripes and tested for peel resistance of the adhesive bond using a 90-degree peel test with a crosshead separation speed of 10 inches (25.4 cm) per minute using an Instron™ Peel Strength Tester from Instron. The method used is as follows. A sample was first allowed to cool 10 minutes after removal from the production line. Using a strip scribe unit, three 7 inch long (18 cm) samples were cut to 1 inch (2.5 cm) width along the machine direction. Each strip was peeled back approximately 1 inch (2.5 cm), the peeled section doubled over by folding, and the folded sections clamped in the instrument. The material was pulled apart at a rate of 5 inches (25.4 cm) per minute, at an angle of 90°. Three measurements are taken at different places on each sample. The mean peel adhesion was recorded in pounds of force (lb.) per linear 1-inch (2.54 cm) strip width. The peel strength (P) was then calculated as follows: P={peeling load, in pounds)}/{width of specimen (inches)}.

TABLE 1

| Component | Description | Supplier |
|---|---|---|
| PC | Bisphenol A polycarbonate, Mw = 30,000 to 37,000 (absolute PC molecular weight scale) | SABIC Innovative Plastics |
| PEC | Blend of 25% by weight Polyester carbonate, Mw = 28,000 to 29,000, 60% ester content with a 50:50 isophthalate/terephthalate ratio and 75% by weight PC (Bisphenol A polycarbonate, Mw = 30,000 to 37,000 (absolute PC molecular weight scale)) | SABIC Innovative Plastics |
| BABS | Bulk Acrylonitrile Butadiene Styrene with nominal 16% butadiene and content and nominal 15% acrylonitrile content, phase inverted with occluded SAN in a butadiene phase in SAN matrix | SABIC Innovative Plastics |
| HRG | Emulsion process ABS with a 50% polybutadiene content with a nominal 80 nanometer emulsion particle size coagulated to a 200 to 500 nanometer broad particle size that is then is grafted with SAN copolymer with a nominal 75% styrene, 25% acrylonitrile content (overall 50% polybutadiene) | SABIC Innovative Plastics |

TABLE 1-continued

| Component | Description | Supplier |
|---|---|---|
| MBS | MBS is nominal 75-82 wt. % butadiene core with a balance styrene-methyl methacrylate shell. (Trade name EXL-2691A) | Rohm & Haas |
| PC-ST | Polycarbonate-Polysiloxane copolymer with 20% eugenol endcapped siloxane D-50, nominal 30,000 MW on absolute PC scale | SABIC Innovative Plastics |
| SAN-1 | Styrene-Acrylonitrile Copolymer with nominal 23 to 25% acrylonitrile content, with a molecular weight of 97,000 (Calibrated on Polystyrene standards based GPC weight average molecular weight) | SABIC Innovative Plastics |
| SAN-2 | Styrene-Acrylonitrile Copolymer with nominal 26 to 28% acrylonitrile content, with a molecular weight of 170,000 (Calibrated on Polystyrene standards based GPC weight average molecular weight) | SABIC Innovative Plastics |
| Talc | Talc having a trade designation MicroTalc MP 15-38 | Specialty Minerals, Inc. |
| Silica | Fumed silica (Aerosil ™ 200) | Degussa |

Examples X-1 to X-8 and XC-1 (control) were prepared using the materials in Table 1. The results of these samples were used to determine the next set of sample data to be generated. The samples were produced using different types of impact modifiers (HRG, BABS, PC-ST and MBS) in combination with PC and SAN. The sample compositions and the results are shown in Table 2. One control sample, XC-1, which represents a commercially available impact modified polycarbonate was also used.

Additional samples were produced using BABS alone, or BABS and PC-ST, as the impact modifier, as well as PC and SAN. The compositions are shown in Table 3, and the results are shown in Table 4. Two control samples, XC-1 (same as in Table 2) and XC-2, which has the same formulation as XC-1 in Table 2, having good adhesion but poor melt stability, were also tested.

TABLE 2

| Exp. # | PC | SAN-1 | BABS | HRG | PC-ST | MBS | Notched Izod Δ 23° C.* ft.lbs/in |
|---|---|---|---|---|---|---|---|
| X-1 | 80 | 20 | 0 | 0 | 0 | 0 | 0.1 |
| X-2 | 65 | 0 | 35 | 0 | 0 | 0 | 0.2 |
| X-3 | 65 | 24 | 0 | 11 | 0 | 0 | 6.0 |
| X-4 | 65 | 17 | 0 | 18 | 0 | 0 | 3.4 |
| X-5 | 60 | 20 | 0 | 0 | 20 | 0 | 2.9 |
| X-6 | 65 | 23 | 0 | 0 | 0 | 12 | 1.7 |
| X-7 | 65 | 27.7 | 0 | 0 | 0 | 7.3 | 2.8 |
| X-8 | 72.1 | 5.5 | 17.9 | 0 | 0 | 4.5 | 0.1 |
| XC-1 | 65 | 16 | 0 | 19 | 0 | 0 | 4.7 |

*Notched Izod Δ is the difference between the Notched Izod under abusive molding conditions and the Notched Izod under normal molding conditions

TABLE 3

| Exp. # | PC | BABS | SAN-1 | HRG | Talc | Silica | PC-ST |
|---|---|---|---|---|---|---|---|
| X-9 | 65 | 22.5 | 12.5 | 0 | 0 | 0 | 0 |
| X-10 | 65 | 22.5 | 12.5 | 0 | 0 | 0 | 0 |
| X-11 | 65 | 22.5 | 12.5 | 0 | 0 | 0 | 0 |
| X-12 | 65 | 22.5 | 12.5 | 0 | 0 | 0.5 | 0 |
| X-13* | 65 | 22.5 | 12.5 | 0 | 0 | 0 | 0 |
| X-14* | 65 | 22.5 | 12.5 | 0 | 0 | 0 | 0 |
| X-15* | 65 | 22.5 | 12.5 | 0 | 0 | 0 | 0 |
| X-16* | 55 | 12.5 | 12.5 | 0 | 0 | 0 | 20 |
| X-17 | 60 | 17.5 | 12.5 | 0 | 0 | 0 | 10 |
| XC-1 | 65 | 0 | 16 | 19 | 0 | 0 | 0 |
| XC-2 | 65 | 0 | 16 | 19 | 0 | 0 | 0 |

*Samples additionally contain 2.5% pigments (2% TiO$_2$ and 0.5% blue (Copper phthalocyanine) pigments) based on 100% of the other components

TABLE 4

| Exp. # | MVR 260° C. 5 Kg (6 min) (cm$^3$/10 min) | MVR 260° C. 5 Kg (18 min) (cm$^3$/10 min) | Melt stab. (MVR 6 min-18 min) % | Normal Notched Izod 23° C. ft.lbf/in | Normal Notched Izod −30° C. ft.lbf/in | Abusive Notched Izod 23° C. ft.lbf/in | Abusive Notched Izod −30° C. ft.lbf/in | Adhesion Peel Energy lb/in |
|---|---|---|---|---|---|---|---|---|
| X-9 | 19.1 | NA | NA | 10.0 | 1.7 | 13.1 | 1.5 | 2.7 |
| X-10 | 18.4 | 21.0 | −12.4 | 10.2 | 2.3 | 11.9 | 2.8 | 2.3 |
| X-11 | 21.2 | 23.3 | −9.2 | 10.8 | 2.8 | 15.3 | 1.8 | 3.4 |
| X-12 | 21.3 | 27.6 | −22.9 | 9.9 | 2.1 | 13.1 | 1.4 | 1.5 |
| X-13 | 20.3 | 30.3 | −33.1 | 10.4 | 2.1 | 12.2 | 2.9 | 1.4 |
| X-14 | 20.2 | 25.6 | −20.9 | 11.5 | 3.2 | 12.3 | 1.5 | 2.0 |
| X-15 | 17.2 | 18.9 | −9.4 | 10.6 | 2.6 | 12.4 | 1.3 | 1.6 |
| X-16 | 13.2 | 16.5 | −19.7 | 16.9 | 12.9 | 14.6 | 9.2 | 5.3 |
| X-17 | 19.1 | 20.7 | −8.0 | 10.8 | 8.3 | 11.9 | 2.6 | 4.3 |
| XC-1 | — | — | — | — | — | — | — | 5.2 |
| XC-2 | — | — | — | — | — | — | — | 5.3 |

Table 2 clearly shows that samples having HRG (emulsion ABS, samples X-3, X-4 and XC-1) are much less stable and have a higher Notched Izod Δ than materials containing BABS (Bulk ABS) or MBS.

Table 4 clearly shows that the examples having an impact modifier composition comprising PC-ST and BABS (X-16 and XC-17) clearly have the best and most consistently high adhesion values, comparable to the adhesion of the two control samples having HRG and the impact modifier. There is a high degree of variability in the adhesion results, but none of the other parameters that might be expected to improve adhesion had any significant influence.

Additional samples were produced using PC, PEC BABS and SAN-2, without any PC-ST. The compositions are shown in Table 5, and the results are shown in Table 6.

TABLE 5

| Exp. # | PC | PEC | BABS | SAN-2 | Others |
|---|---|---|---|---|---|
| B-1 | 48.75 | 16.25 | 34.2 | 0 | 0.8 |
| B-2 | 21.45 | 48.75 | 29 | 0 | 0.8 |
| B-3 | 48.75 | 21.45 | 20.2 | 8.8 | 0.8 |
| B-4 | 21.45 | 48.75 | 29 | 0 | 0.8 |
| B-5 | 16.25 | 48.75 | 20.2 | 14 | 0.8 |
| B-6 | 48.75 | 16.25 | 27.2 | 7 | 0.8 |
| B-7 | 35 | 35 | 20.2 | 9 | 0.8 |
| B-8 | 48.75 | 16.25 | 20.2 | 14 | 0.8 |
| B-9 | 16.25 | 48.75 | 34.2 | 0 | 0.8 |
| B-10 | 16.25 | 48.75 | 20.2 | 14 | 0.8 |
| B-11 | 41.275 | 27.625 | 27.45 | 2.85 | 0.8 |
| B-12 | 16.25 | 48.75 | 20.2 | 14 | 0.8 |
| B-13 | 32.5 | 32.5 | 34.2 | 0 | 0.8 |
| B-14 | 16.25 | 48.75 | 34.2 | 0 | 0.8 |

TABLE 6

| Exp. # | MVR 260° C. 5 Kg (6 min) (cm$^3$/10 min) | Melt stab. (MVR 6 min-18 min) % | Normal Notched Izod −20° C. kJ/m$^2$ | Normal Notched Izod −40° C. kJ/m$^2$ |
|---|---|---|---|---|
| B-1 | 7.3 | 8.3 | 53.6 | 20.0 |
| B-2 | 3.5 | −0.6 | 15.5 | 10.5 |
| B-3 | 5.5 | 4.9 | 22.1 | 12.9 |
| B-4 | 3.4 | −0.6 | 15.9 | 10.4 |
| B-5 | 3.9 | 1.3 | 7.8 | 5.2 |
| B-6 | 6.9 | 9.2 | 27.8 | 13.7 |
| B-7 | 4.4 | 2.5 | 16.2 | 11.7 |
| B-8 | 6.9 | 8.0 | 23.4 | 9.2 |
| B-9 | 3.7 | 0.5 | 14.6 | 7.3 |
| B-10 | 3.7 | 1.9 | 10.7 | 5.3 |
| B-11 | 5.0 | 1.4 | 26.8 | 15.2 |
| B-12 | 3.8 | 2.4 | 7.3 | 6.2 |
| B-13 | 5.4 | 5.5 | 23.1 | 9.9 |
| B-14 | 3.8 | 2.4 | 11.9 | 7.6 |

Table 6 clearly shows that certain combinations of polycarbonate, polyestercarbonate, BABS and SAN provide compositions having superior properties, particularly those beneficial for specific applications. For these applications, it is beneficial to have excellent melt stability (% difference change in viscosity between 6 minutes and 18 minutes is as close to zero or no change as possible), and excellent low temperature impact (the higher the better). The compositions having from 30 to 50 wt. % polycarbonate, 15 to 35 wt. % polyestercarbonate, 25 to 35 wt. % BABS and optionally, from 0 to 10 wt. % SAN provide the best or optimum results, as shown by the results in Table 6 (for example, see Examples B-1, B-6 and B11).

Statistical software was used to determine the correlations and the 'optimum' composition. The criteria used in the selection are as follows: MVR was minimized for improved processing in coextrusion; Melt Stability was targeted to be zero with absolute limits of +10% or −10% (Melt Stability must be between −10% and +10%), and material that does not meet this standard is unacceptable in the selected application; Notched Izod impact at −20° C. was targeted to be greater than 25 kJ/m$^2$; Notched Izod impact greater than 20 kJ/m$^2$ at −20° C., specifically greater than 25 kJ/m$^2$ at −20° C. is a minimum requirement, and material that does not meet this standard is unacceptable in this application; and Notched Izod impact at −40° C. greater than 10 kJ/m$^2$; Notched Izod impact greater than 9 kJ/m$^2$ at −40° C., specifically greater than 10 kJ/m$^2$ at −40° C. is a minimum requirement, and material that does not meet this standard is unacceptable in this application.

MVR was optimized with a weight of 1 (linear response) and an importance of 5. Melt Stability was optimized with a weight of 1 (linear response) and an importance of 5. Notched Izod impact at −20° C. was limited to be in the range of 25 kJ/m$^2$ up to the highest value observed, which was 53.64 kJ/m$^2$. Izod impact at −40° C. was limited to be in the range of 10 kJ/m$^2$ up to the highest value observed, which was 20.01 kJ/m$^2$. Since MVR and Melt Stability were given the same weight and importance, there was no effect present due to differences in optimization criteria. The optimum is obtained with an importance value greater than 0.1.

The results of the analysis are as follows:

MVR 6 min, 260° C. 5 Kg=+0.038154*PC−
0.056958*PEC+0.17768*BABS+
0.16343*SAN-2    Equation 1:

R-Squared=0.9808

Melt Stability (6-18), %=−0.068107*PC−
0.26633*PEC+0.46231*BABS+0.47796*SAN-2    Equation 2:

R-Squared=0.9217

Ln(Izod Impact Strength @−20° C.)=+0.044707*PC+
0.012098*PEC+0.039791*BABS−1.91842E-
003*SAN-2    Equation 3:

R-Squared=0.9370

1/(ISO Izod Impact Strength @−40° C.)=−2.18367E-
003*PC+1.65722E-004*PEC+4.67902E-
003*BABS+8.16127E-003*SAN-2    Equation 4:

R-Squared=0.9559

As shown by the analysis, the R-squared values are all very high (greater than 0.92), showing very good correlation with the data. From this information and the graphs generated, the selected amounts of the four components (PC, PEC, BABS and SAN-2) could be calculated. The equations used to calculate the optimum ranges of components are as follows:

Upper left boundary: BABS+0.8929*SAN-2=28.6%

Lower right boundary: BABS+1.0035*SAN-2=34.27%

Top boundary: PC=48.73%

Bottom boundary: BABS+1.124*PC+0.3040*PEC−
0.04987*SAN-2=80.89%

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

I claim:

1. A thermoplastic composition, comprising:
   30 to 50 wt.% of a polycarbonate;
   15 to 35 wt.% of a polyester carbonate;
   25 to 35 wt.% of an impact modifier;
   polycarbonate-polysiloxane copolymer; and
   0 to 10 wt.% of an aromatic vinyl copolymer;
   based on the total combined weight of the polycarbonate, polyester carbonate, impact modifier and aromatic vinyl copolymer,
   wherein the composition has a Notched Izod impact value at −20° C. of greater than 20 kJ/m$^2$ and a Notched Izod impact at −40° C. greater than 9 kJ/m$^2$, both when measured according to ASTM D256; and
   wherein the composition has a Melt Stability between −10% and +10% when measured as the percent shift in Melt Volume Rate from a 6 minute preheat to an 18 minute preheat, when measured according to ASTM D1238 at 260° C. using a 5 kilogram weight over 10 minutes.

2. The thermoplastic composition of claim 1, wherein the composition has a Notched Izod impact value at −20° C. of greater than 25 kJ/m$^2$ and a Notched Izod impact at −40° C. greater than 10 kJ/m$^2$, both when measured according to ASTM D256.

3. The thermoplastic composition of any of claim 1, wherein the polycarbonate-polysiloxane copolymer is present in an amount of up to 20 wt.%.

4. The thermoplastic composition of claim 1, comprising the aromatic vinyl copolymer, and wherein the aromatic vinyl copolymer comprises SAN.

5. The thermoplastic composition of claim 4, wherein the SAN has a nominal acrylonitrile content of from 26 to 28 weight percent.

6. An article comprising the thermoplastic composition of claim 1.

7. The thermoplastic composition of claim 1, wherein the impact modifier is Bulk ABS.

8. An article comprising:
   a polymer substrate;
   a superstrate comprising a polycarbonate; and
   a tie layer, wherein the tie layer comprises the composition of claim 1, and wherein the tie layer is disposed between the substrate and the superstrate.

9. The article of claim 8, wherein the impact modifier comprises ABS.

* * * * *